(12) United States Patent
Suguro et al.

(10) Patent No.: US 9,805,842 B2
(45) Date of Patent: Oct. 31, 2017

(54) WIRE HARNESS

(71) Applicant: Yazaki Corporation, Minato-ku, Tokyo (JP)

(72) Inventors: Masaaki Suguro, Makinohara (JP); Hideomi Adachi, Makinohara (JP); Tatsuya Oga, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/902,112

(22) PCT Filed: Jul. 2, 2014

(86) PCT No.: PCT/JP2014/067680
§ 371 (c)(1),
(2) Date: Dec. 30, 2015

(87) PCT Pub. No.: WO2015/002243
PCT Pub. Date: Jan. 8, 2015

(65) Prior Publication Data
US 2016/0276064 A1    Sep. 22, 2016

(30) Foreign Application Priority Data
Jul. 2, 2013    (JP) .................................. 2013-138797

(51) Int. Cl.
*H01B 7/17*    (2006.01)
*B60R 16/02*    (2006.01)
(Continued)

(52) U.S. Cl.
CPC ................ *H01B 7/17* (2013.01); *B60L 11/18* (2013.01); *B60R 16/0207* (2013.01);
(Continued)

(58) Field of Classification Search
USPC .............................................. 174/72 A, 72 C
See application file for complete search history.

(56) References Cited

U.S. PATENT DOCUMENTS 1,698,050 A * 1/1929 Emanueli ................ H01B 7/226
174/106 D
4,456,331 A * 6/1984 Whitehead ........... G02B 6/4407
385/103

(Continued)

FOREIGN PATENT DOCUMENTS

CN    1241281 A    1/2000
CN    201549266 U    8/2010
(Continued)

OTHER PUBLICATIONS

Aug. 12, 2014—International Search Report—Intl App PCT/JP2014/067680.
(Continued)

*Primary Examiner* — William H Mayo, III
*Assistant Examiner* — Krystal Robinson
(74) *Attorney, Agent, or Firm* — Banner & Witcoff, Ltd.

(57) ABSTRACT

A conductive path (1) used in a wire harness includes a conductor (2) and an insulator (3). The conductive path (1) includes parts corresponding to route restriction sections (A, B) where route restriction is required, and parts corresponding to sections other than the route restriction sections (A, B), that is, different sections (C, D, E). The insulator (3) includes an extrusion-molded insulator main body (4) and multiple thick parts (6) post-attached to an outer surface (5) of the insulator main body (4). The thick parts (6) are disposed and formed at positions corresponding to the route restriction sections (A, B).

8 Claims, 4 Drawing Sheets

(51) Int. Cl.
  *H02G 3/04*    (2006.01)
  *B60L 11/18*   (2006.01)
  *H01B 7/00*    (2006.01)
  H01B 13/14     (2006.01)
  H01B 7/24      (2006.01)

(52) U.S. Cl.
  CPC ....... *B60R 16/0215* (2013.01); *H01B 7/0045* (2013.01); *H02G 3/0462* (2013.01); *H01B 7/24* (2013.01); *H01B 13/146* (2013.01)

(56) References Cited

U.S. PATENT DOCUMENTS

| | | | | |
|---|---|---|---|---|
| 5,168,128 A | * | 12/1992 | Thomsen | H01R 13/72 174/135 |
| 5,345,531 A | * | 9/1994 | Keplinger | B29C 47/0016 362/554 |
| 5,990,419 A | * | 11/1999 | Bogese, II | H01B 7/184 174/113 AS |
| 6,331,677 B1 | | 12/2001 | Munakata et al. | |
| 6,424,768 B1 | * | 7/2002 | Booth | G02B 6/4427 174/116 |
| 6,666,232 B2 | | 12/2003 | Lepoutre | F02M 35/10137 138/119 |
| 6,795,625 B1 | * | 9/2004 | Ishii | G02B 6/4489 385/110 |
| 7,172,042 B2 | * | 2/2007 | Yamaguchi | B60K 6/48 180/65.1 |
| 7,964,797 B2 | * | 6/2011 | Clark | H01B 7/184 174/110 R |
| 8,563,866 B2 | | 10/2013 | Oga et al. | |
| 2009/0014203 A1 | | 1/2009 | Bikhleyzer | |
| 2009/0233052 A1 | * | 9/2009 | Thuot | H01B 7/0233 428/159 |
| 2011/0132638 A1 | | 6/2011 | Oga et al. | |
| 2014/0102783 A1 | | 4/2014 | Nagahashi | |
| 2017/0146760 A1 | * | 5/2017 | Kaji | G02B 6/4433 |

FOREIGN PATENT DOCUMENTS

| | | |
|---|---|---|
| CN | 203521862 U | 4/2014 |
| JP | S49-047669 B1 | 12/1974 |
| JP | S64-076622 A | 3/1989 |
| JP | 2010-051042 A | 3/2010 |
| JP | 2012-121251 A | 6/2012 |
| JP | 2012-210101 A | 10/2012 |
| JP | 2012210101 A * | 10/2012 |
| JP | 2012-243550 A | 12/2012 |

OTHER PUBLICATIONS

Jan. 14, 2016—(WO) IPRP—App PCT/JP2014/067680.
Nov. 9, 2016—(CN) Notification of the First Office Action—App 201480038022.5.
Apr. 6, 2017—(CN) The Second Office Action—App 201480038022.5.
Apr. 26, 2017—(JP) Notification of Reasons for Refusal—App 2013-138797.
Feb. 23, 2017—(JP) Notification of Reasons for Refusal—App 2013-138797.
Aug. 18, 2017—(CN) The Third Office Action—App 201480038022.5

* cited by examiner

WIRE HARNESS

TECHNICAL FIELD

The invention relates to a wire harness including one or multiple conductive paths.

BACKGROUND ART

Conventionally, there is known a wire harness for electrically connecting together high-voltage equipment to be mounted, for example, on hybrid or electric vehicles.

A wire harness disclosed in the below-cited patent document 1 includes multiple conductive paths, a resin-made corrugated tube for storing the multiple conductive paths collectively, and a resin-made protector. The corrugated tube is formed in a flexible bellows shape and is constituted of multiple tubes arranged side by side in the longitudinal direction of the wire harness. The protector is arranged in a location where route restriction is required. The protector is also arranged at a position to connect together the mutually adjoining corrugated tubes. The corrugated tube and protector are used as exterior members.

PRIOR ART TECHNOLOGY DOCUMENT

Patent Document

Patent Document 1: JP-A-2010-51042

DISCLOSURE OF THE INVENTION

Problems that the Invention is to Solve

In the above conventional technology, for route restriction, post-attached exterior members are necessary. This increases the number of parts and thus the cost of a wire harness, and increases workload for manufacturing the wire harness.

To solve these problems, there is required a structure which excludes the post-attached exterior member. However, simple exclusion of the exterior member disables the route restriction.

The invention is made in view of the above circumstances and thus has an object to provide a wire harness which can realize route restriction even when the post-attached exterior member is excluded and also reduce cost and workload by excluding the post-attached exterior member.

Means for Solving the Problems

In attaining the above object, the invention provides a wire harness including one or multiple conductive paths, wherein the conductive path includes a conductor and a sheath that covers the conductor, the sheath includes a sheath main body and multiple thick parts post-attached to an outer surface of the sheath main body along a peripheral direction correspondingly to a route restriction section where route restriction is required, and a part of the sheath with the thick parts post-attached thereto are formed as a rigid part of the conductive path.

According to the invention having such characteristics, its structure includes the conductive path, and the conductive path includes the conductor and sheath. The sheath includes the thick parts post-attached to the outer surface of the sheath main body, and the thick parts are arranged correspondingly to the route restriction section. Therefore, in the route restriction section, the sheath section area can be increased and the thick parts enable the rigidity thereof. The above structure of the conductive path enables route restriction even when the post-attached exterior member is excluded.

Also, according to the invention, in the above wire harness, the part of the sheath with the thick parts post-attached thereto is formed as a straight part of the conductive path.

According to the invention having such characteristics, the part of the sheath with the thick parts post-attached thereto has large thickness and rigidity; and also, the part forms the straight part. Thus, when performing such route restriction as maintains the straight state, the part serves as an effective part.

Effects of the Invention

According to the invention, as can also be understood from the structure of the conductive path, route restriction is possible even when the post-attached exterior member is excluded. Also, exclusion of the post-attached exterior member can realize reduction in cost and workload.

BRIEF DESCRIPTION OF DRAWINGS

FIG. 2(a) is a side view and FIG. 2(b) is a section view taken along the F-F line.

FIG. 3(a) is a section view illustrating a single core structure, and FIG. 3(b) is a section view illustrating a two-core structure.

DESCRIPTION OF EMBODIMENTS

The wire harness includes one or multiple conductive paths. Each conductive path includes a conductor and a sheath. Due to the post-attached thick parts, the sheath is different in thickness and rigidity according to the sections thereof.

EXAMPLES

Figure 1:
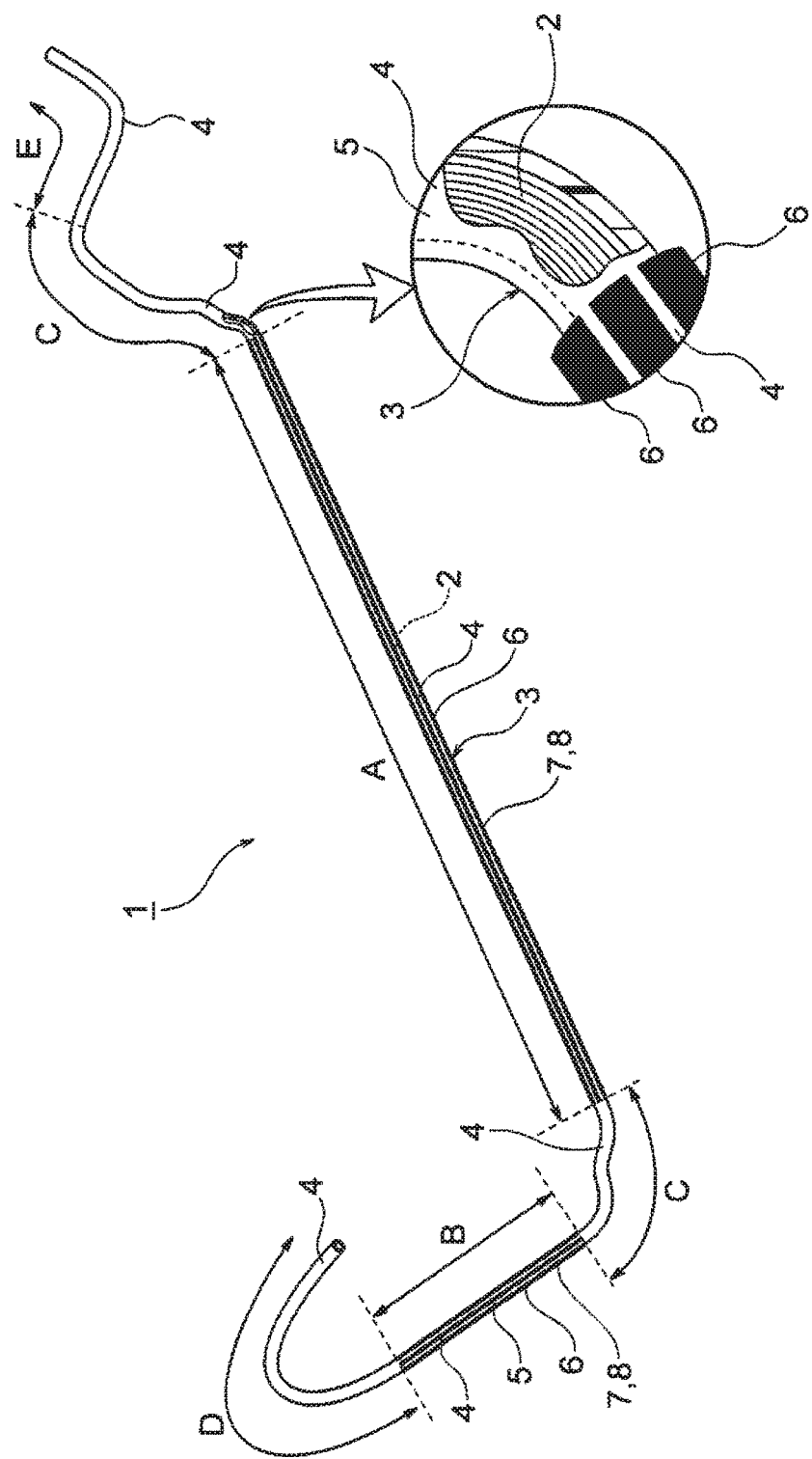
FIG. 1 is a perspective view of a conductive path constituting a wire harness according to the invention.
Figure 3:
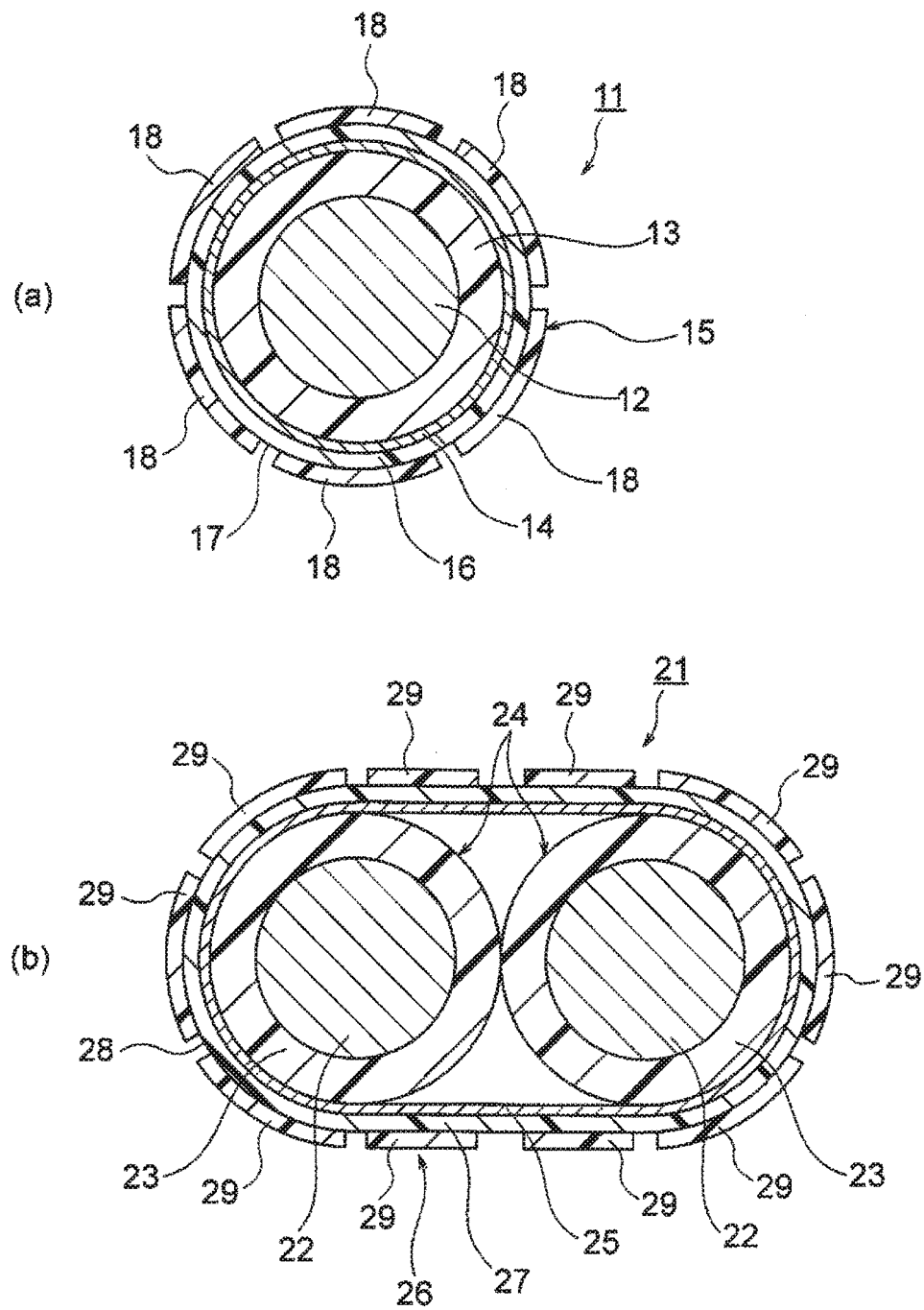
FIGS. 3(a) and 3(b) illustrate other examples of the conductive path.
Figure 4:
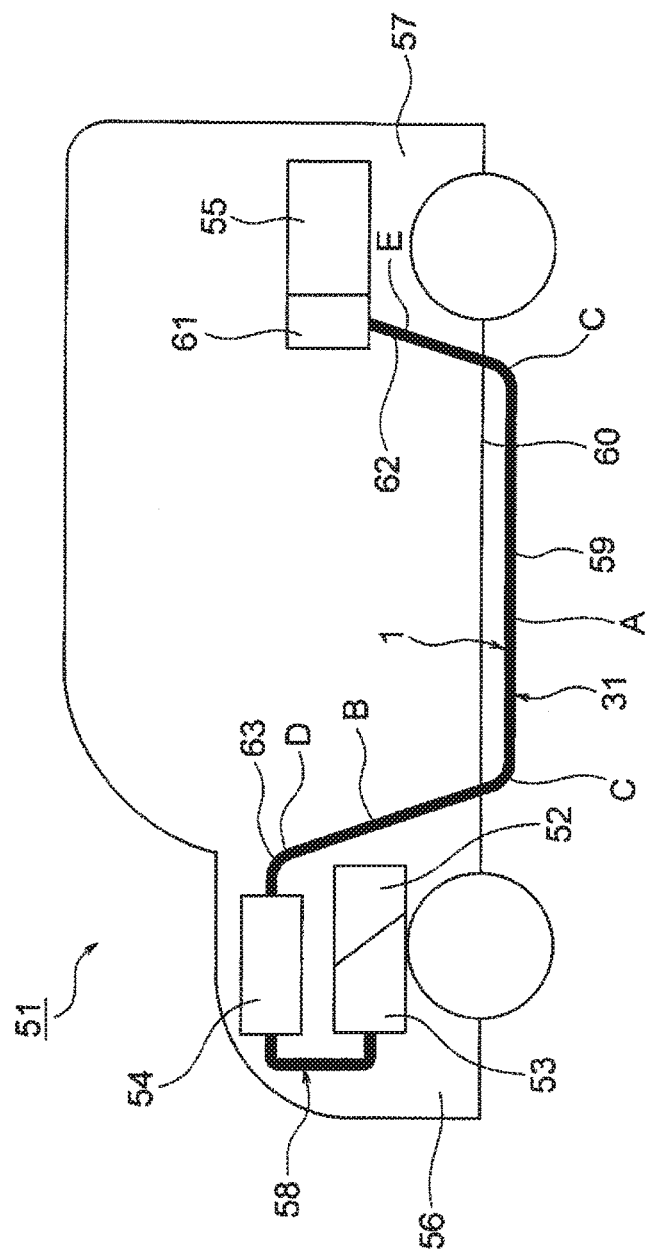
FIG. 4 is a schematic diagram of an arranged state of the wire harness according to the invention.

Description is given below of examples with reference to the drawings. FIG. 1 is a perspective view of a conductive path constituting a wire harness according to the embodiment. FIGS. 2(a) and 2(b) are a side view and a section view of the conductive path, FIGS. 3(a) and 3(b) are section views of other examples of the conductive path, and FIG. 4 is a schematic diagram of an arranged state of the wire harness according to the invention.

Figure 2:
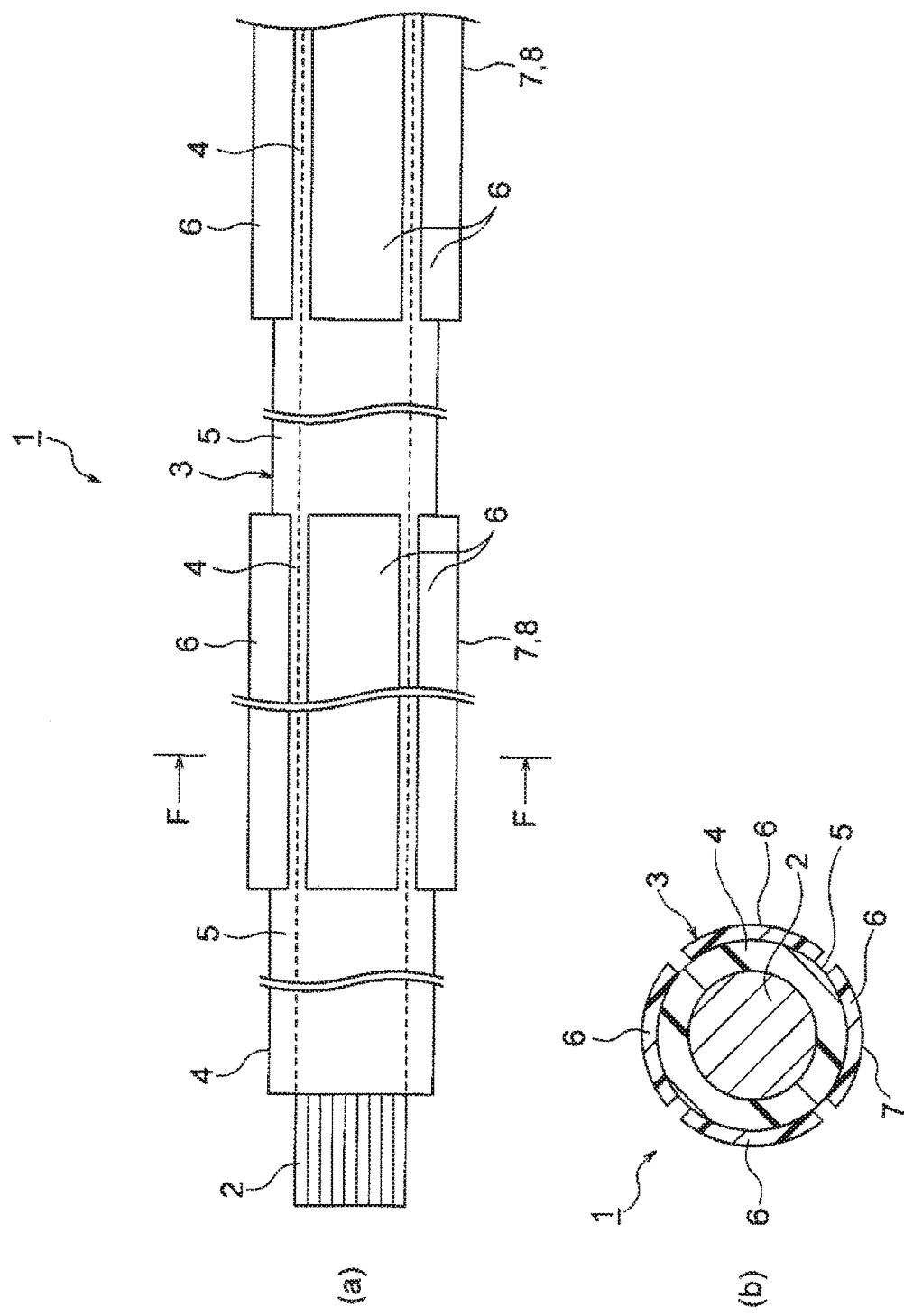
FIGS. 2(a) and 2(b) illustrate the conductive path.

In FIGS. 1 and 2, reference numeral 1 designates a conductive path constituting a wire harness according to the invention. This conductive path 1 is one for high voltage (high-voltage conductive path) and includes a conductor 2 and an insulator 3 (sheath). The conductive path 1, as will be understood from the following description, is structured such that its shape varies according to the sections thereof.

The conductive path 1 includes parts constituted of route restriction sections A, B where route restriction is required and different parts constituted of sections other than the route restriction sections A, B, that is, different sections C, D, E (the number of sections is an example). The route restriction section A is here set long, while the route restriction section B is set shorter than the section A. The different section C is set to have a specific length from the end of the route restriction section A. The different sections D, E are set to have a specific length on the two ends of the conductive path 1. The route restriction sections A, B part has such rigidity as can retain shape, whereas the different sections C, D, E part is lower in rigidity than the route restriction sections A, B and is flexible.

The conductor 2 is made of metal and has conductivity. The conductor 2 is formed to extend with the substantially same diameter from one end to the other end of the conductive path 1. The conductor 2 is made of copper or copper alloy, or aluminum or aluminum alloy. The conductor 2 may have a conductor structure including intertwined strands, or a rod-shaped conductor structure having a rectangular or round section (for example, a conductor structure having a straight single core or a round single core; in this case, the electric wire itself is formed in a rod shape). In this embodiment, aluminum-made intertwined strands are employed.

Here, there may also be employed a conductor structure having a plate shape like a known bus bar and the like. Also, in the case of intertwined strand, the strands may also be intertwined together with a core member (a wire member serving as a rigid body) as the center. On an outer surface of the above conductor 2, there is formed by extrusion molding an insulator 3 (specifically, an insulator main body 4 to be described later) made of insulating resin material (such as PP, PVC and cross-linked PE. It must be selected properly in consideration of wear resistance, chemical resistance, heat resistance and the like). The insulator 3 is formed to extend from one end to the other end of the conductive path 1.

It includes an insulator main body 4 (sheath main body) formed by extrusion molding and multiple thick parts 6 post-attached to the outer surface 5 of the insulator main body 4. The thick parts 6 are arranged at positions corresponding to the route restriction sections A, B of FIG. 1. Here, parts without the thick parts 6 correspond to the different sections C, D, E.

The insulator main body 4 is formed to have a thickness capable of securing the minimum level of insulation to the conductor 2. That is, The insulator main body 4 is formed to have the same thickness as the insulator of a conventional high-voltage wire. Since the section shape of the conductor 2 is circular as illustrated, it is formed in a circular shape capable of covering the conductor 2 outer periphery (the section shape is an example). The insulator main body 4 is formed such that the thickness from the inner surface to the outer surface 5 is substantially uniform, that is, the thickness in the peripheral direction is substantial uniform.

The insulator main body 4 is a part serving as the base of the insulator 3 and is formed to extend from one end to the other end of the conductive path 1. The insulator main body 4 is flexibly formed. Thus, in the parts corresponding to the different sections C, D, E, this flexibility enables bendable formation of the conductive path 1. Here, since the parts corresponding to the different sections D, E is formed bendably as described above, it can secure good connection with its electric connecting partner.

The thick part 6, as described above, is formed as a part to be post-attached to the outer surface 5 of the insulator main body 4. This thick part 6 is formed such that it changes the sheath thickness of the conductive path 1 to increase. The thick part 6 is formed in multiple numbers to extend straight in the axial direction of the conductive path 1 with desired height and width. The multiple thick parts 6 are arranged at desired intervals in the peripheral direction (the shape and the number in the drawings are an example).

The route restriction sections A, B with the thick parts 6 are formed thicker in sheath thickness than the different sections C, D, E (than the insulator of a conventional high-voltage wire). That is, the sections formed with the thick parts are formed such that the sheath section area thereof is large.

The parts corresponding to the route restriction sections A, B, due to formation of the thick parts 6, have sufficiently greater rigidity and strength than the parts corresponding to the different sections C, D, E. Such great rigidity enables shape retention of the conductive path 1. Also, such strength enables sufficient securement of insulation to the conductor 2 even when wear or external force is applied.

The parts corresponding to the route restriction sections A, B, due to formation of the thick parts 6, is formed as the rigid parts 7 of the conductive path 1. Also, as can be seen from the drawings, since it is straight, it is also formed as the straight parts 8 of the conductive path 1.

To form the thick part 6, after the insulator main body 4 is extruded onto the outer surface of the conductor 2 to mold into the above shape, molten resin composition may be extrusion molded onto the outer surface 5 of the insulator main body 4 from a different nozzle from a nozzle for the insulator main body 4. By changing the shape and number of such different nozzles, the thick parts 6 can be formed in various shapes. In the insulator 3, when the resin composition is extrusion molded from the different nozzle, the thick parts 6 are formed and, when the resin composition extrusion is stopped, it is formed as a part constituted only of the insulator main body 4.

Here, description is given of a modification of the conductive path with reference to FIGS. 3(a) and 3(b). Describing FIG. 3(a) first, reference numeral 11 designates a shielded electric wire (conductive path). The shielded electric wire 11 includes a conductor 12, an insulator 13 that covers the conductor 12, a shield member 14 provided on the outside of the insulator 13, and a sheath 15 (sheath) provided on the outside of the shield. member 14. The shielded electric wire 11 is a high-voltage wire having a shield function.

The shield member 14 is formed by a known braid or metal foil, and has conductivity. The sheath 15 includes an extrusion-molded sheath main body 16 (sheath main body), and multiple thick pasts 18 post-attached to the outer surface 17 of the sheath main body 16. The sheath main body 16 and thick parts 18 have the same functions as the insulator main body 4 and thick parts 6 of the conductive path 1 in FIGS. 1, 2(a) and 2(b).

Next, reference numeral 21 in FIG. 3(b) designates a cabtire cable (conductive path). The cabtire cable 21 includes two electric wires 24 each having a conductor 22 and an insulator 23, a shield member 25 provided on the outside of the two electric wires 24 in a juxtaposed state, and a sheath 26 (sheath) provided on the outside of the shield member 25. The cabtire cable 21 is a high-voltage wire having a shield function.

The shield member 25, similarly to the shield member 14, is formed by a known braid or metal foil, and has conductivity. Here, three or more wires 24 may also be used. The sheath 26 includes an extrusion-molded sheath main body 27 (sheath main body) and multiple thick parts 29 post-attached to the outer surface 28 of the sheath main body 27. The sheath main body 27 and thick parts 29 have the same functions as the insulator main body 4 and thick parts 6 of the conductive path 1 of FIGS. 1, FIG. 2(a) and FIG. 2(b).

In the above modification, using the conductive path 1 and shielded electric wire 11, or cabtire cable 21, a wire harness 31 is manufactured. The wire harness 31, as illustrated in FIG. 4, is arranged, for example, at a specific position of a hybrid vehicle (which may also be an electric vehicle or an ordinary vehicle).

In FIG. 4, reference numeral 51 designates a hybrid vehicle. The hybrid vehicle 51 is driven by combining two kinds of power from an engine 52 and a motor unit 53, while electric power is supplied to the motor unit 53 from a battery 55 (cell pack) through an inverter unit 54. The engine 52, motor unit 53 and inverter unit 54, in this embodiment, are mounted in an engine room 56 where front wheels and the like exist. Also, the battery 55 is mounted in a vehicle rear part 57 where rear wheels and the like exist (it may also be mounted within a vehicle room existing backward of the engine room 56).

The motor unit 53 and inverter unit 54 are connected together by a high-voltage motor cable 58. The battery 55 and inverter unit 54 are connected together by a high-voltage wire harness 31. An intermediate part 59 of the wire harness 31 is arranged on a vehicle underfloor 60 substantially in parallel along the vehicle underfloor 60. The intermediate part 59 is arranged with its shape retained. The vehicle underfloor 60 is a known body and is a so called panel member which has a penetration hole (not illustrated) at a specific position. The wire harness 31 is inserted through this penetration hole.

The wire harness 31 and battery 55 are connected together through a junction block 61 provided in the battery 55. To the junction block 61, the rear end 62 of the wire harness 31 is electrically connected by a known method. The front end 63 of the wire harness 31 is electrically connected to the inverter unit 54 by a known method. The front and rear ends 63 and 62 of the wire harness 31 are flexible and are easy for electric connection.

As has been described heretofore with reference to FIGS. 1 to 4, according to the wire harness 31 of the invention, as can also be understood from the structure of the conductive path 1, even when the post-attached exterior member is excluded, route restriction is possible. Also, exclusion of the post-attached exterior member enables reduction in cost and workload.

Of course, the invention can also be changed variously without departing from the subject matter of the invention.

Now, the characteristics of the above embodiment of the invention are described briefly in the following articles [1] and [2].

[1] The wire harness (31) including one or multiple conductive paths (1), wherein the conductive path includes a conductor (2) and a sheath (insulator 3) that covers the conductor (2), the sheath (3) includes a sheath main body (insulator main body 4) and multiple thick parts (6) post-attached to the outer surface (5) of the sheath main body along the peripheral direction correspondingly to route restriction sections (A, B) where route restriction is required, and the part of the sheath with the thick parts post-attached thereto is formed as the rigid part (7) of the conductive path.

[2] The wire harness according to the article [1], wherein. the part of the sheath with the thick parts post-attached thereto is formed as the straight part (8) of the conductive path.

Although the invention has been described heretofore specifically with reference to the specific embodiments thereof, it is obvious to those skilled in the art that various changes and modifications are possible without departing from the spirit and scope of the invention.

This application is based on the Japanese Patent Application (JPA No. 2013-138797) filed on Jul. 2, 2013 and thus the contents thereof are incorporated herein for reference.

INDUSTRIAL APPLICABILITY

According to the invention, as can also be understood from the structure of the conductive path, even when a post-attached exterior member is excluded, route restriction is possible. And, by excluding the post-attached exterior member, cost and workload can be reduced. The invention having this effect can be effectively applied to a wire harness including one or multiple conductive paths.

DESCRIPTION OF REFERENCE NUMERALS AND SIGNS

1: conductive path
2: conductor
3: insulator (sheath)
4: insulator main body (sheath main body)
5: outer surface
6: thick part
7: rigid part
8: straight part
11: shielded electric wire (conductive path)
12: conductor
13: insulator
14: shield member
15: sheath (sheath)
16: sheath main body (sheath main body)
17: outer surface
18: thick part
21: cabtire cable (conductive path)
22: conductor
23: insulator
24: electric wire
25: shield member
26: sheath (sheath)
27: sheath main body (sheath main body)
28: outer surface
29: thick part
31: wire harness
A, B: route restriction section
C to E: different section

The invention claimed is:
1. A wire harness comprising:
a conductive path including:
a conductor extending in an extending direction; and
a sheath that covers the conductor,
wherein the sheath includes a pre-formed bendable sheath main body and multiple thick parts post-attached to an outer surface of the pre-formed bendable sheath main body along a peripheral direction, the multiple thick parts being spaced apart from one another in the peripheral direction of the sheath with portions of the sheath main body being exposed between the multiple thick parts, the peripheral direction being perpendicular to the extending direction, and
wherein a part of the sheath with the thick parts post-attached thereto is formed as a rigid part of the conductive path.

2. A wire harness according to claim 1, wherein the part of the sheath with the thick parts post-attached thereto is formed as a straight part of the conductive path.

3. The wire harness according to claim 1, wherein each of the multiple thick parts does not contact any other thick part of the multiple thick parts.

4. A wire harness according to claim 1, wherein the sheath is an insulator, and the sheath main body is an insulator main body.

5. The wire harness according to claim 1, wherein at least one of the multiple thick parts is longer in the peripheral direction than at least one of the portions of the sheath main body exposed between the multiple thick parts.

6. A wire harness comprising:
a conductive path including:
a conductor extending in a extending direction; and
a sheath covering the conductor, wherein the sheath includes:
a pre-formed bendable sheath main body; and
a plurality of thick portions disposed on the pre-formed bendable sheath main body in a peripheral direction, the thick portions extending farther away from the conductor than the sheath main body, the peripheral direction being perpendicular to the extending direction,
wherein at least two thick portions of the plurality of thick portions are spaced apart from one another in the peripheral direction of the sheath with portions of the sheath main body being exposed between the at least two thick portions.

7. A wire harness according to claim 6, wherein the sheath is an insulator, and the sheath main body is an insulator main body.

8. The wire harness according to claim 6, wherein at least one of the plurality of thick parts is longer in the peripheral direction than at least one of the portions of the sheath main body exposed between the at least two thick portions.

* * * * *